US007545426B2

(12) United States Patent
Hiyama et al.

(10) Patent No.: US 7,545,426 B2
(45) Date of Patent: Jun. 9, 2009

(54) IMAGE PICKUP APPARATUS

(75) Inventors: Hiroki Hiyama, Zama (JP); Toru Koizumi, Yokohama (JP); Katsuhito Sakurai, Tokyo (JP); Fumihiro Inui, Yokohama (JP); Masaru Fujimura, Atsugi (JP); Tomoko Eguchi, Atsugi (JP); Masanori Ogura, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 699 days.

(21) Appl. No.: 11/205,049

(22) Filed: Aug. 17, 2005

(65) Prior Publication Data

US 2005/0269610 A1  Dec. 8, 2005

Related U.S. Application Data

(62) Division of application No. 09/791,544, filed on Feb. 26, 2001, now Pat. No. 6,965,408.

(30) Foreign Application Priority Data

| Feb. 28, 2000 | (JP) | ............................. 2000-051908 |
| Feb. 16, 2001 | (JP) | ............................. 2001-040167 |

(51) Int. Cl.
  *H04N 5/335* (2006.01)
(52) U.S. Cl. .................................................. 348/308
(58) Field of Classification Search ................ 348/241, 348/243, 291, 292, 301, 302, 304, 308, 208.1
  See application file for complete search history.

(56) References Cited

U.S. PATENT DOCUMENTS

| 4,791,493 | A | 12/1988 | Ogura et al. ................. 358/294 |
| 4,920,431 | A | 4/1990 | Ogura et al. ................. 358/496 |
| 4,926,058 | A | 5/1990 | Iwamoto et al. ........... 250/578.1 |
| 4,996,606 | A | 2/1991 | Kawai et al. ................. 358/475 |
| 5,196,691 | A | 3/1993 | Kitani et al. .............. 250/208.1 |
| 5,352,883 | A | 10/1994 | Kitani et al. .............. 250/208.1 |
| 5,526,141 | A | 6/1996 | Ogura et al. ................. 358/496 |
| 5,621,206 | A | 4/1997 | Kitani et al. .............. 250/208.1 |
| 5,900,622 | A | 5/1999 | Ogura et al. .............. 250/208.1 |
| 5,907,356 | A | 5/1999 | Morimoto ................... 348/311 |
| 5,920,092 | A * | 7/1999 | Watanabe .................... 257/292 |

(Continued)

FOREIGN PATENT DOCUMENTS

EP  0 905 788  3/1999

(Continued)

*Primary Examiner*—Tuan V Ho
*Assistant Examiner*—Akshay Trehan
(74) *Attorney, Agent, or Firm*—Fitzpatrick, Cella, Harper & Scinto

(57) ABSTRACT

There is provided an image pickup apparatus comprising a plurality of pixels each including a photoelectric conversion unit which converts incident light into an electrical signal and accumulates the electrical signal, an amplifier transistor which amplifies and outputs the signal from the photoelectric conversion unit, a transfer transistor which transfers the electrical signal accumulated in the photoelectric conversion unit to the amplifier transistor, and a processing transistor which performs predetermined processing, and a control circuit which sets the signal level supplied to the control electrode of the transfer transistor in order to turn off the transfer transistor to be lower than the signal level supplied to the control electrode of the processing transistor in order to turn off the processing transistor.

10 Claims, 15 Drawing Sheets

U.S. PATENT DOCUMENTS

| | | | |
|---|---|---|---|
| 5,920,345 A * | 7/1999 | Sauer | 348/308 |
| 6,002,287 A | 12/1999 | Ueno et al. | 327/307 |
| 6,015,200 A | 1/2000 | Ogura | 347/3 |
| 6,246,043 B1 | 6/2001 | Merrill | 250/208.1 |
| 6,410,899 B1 | 6/2002 | Merrill et al. | 250/208.1 |
| 6,521,926 B1 | 2/2003 | Sasaki | 257/292 |
| 6,534,757 B2 | 3/2003 | Inui et al. | 250/208.1 |
| 6,567,571 B1 | 5/2003 | Kochi et al. | 382/312 |
| 6,587,603 B1 | 7/2003 | Sakurai et al. | 382/312 |
| 6,633,334 B1 | 10/2003 | Sakurai et al. | 348/308 |
| 6,650,369 B2 | 11/2003 | Koizumi et al. | 348/301 |
| 6,670,990 B1 | 12/2003 | Kochi et al. | 250/208.1 |
| 6,757,016 B1 | 6/2004 | Ueno et al. | 348/279 |
| 6,801,255 B2 | 10/2004 | Inui | 348/241 |
| 6,831,685 B1 | 12/2004 | Ueno et al. | 348/243 |
| 6,839,084 B1 | 1/2005 | Hiyama et al. | 348/241 |
| 6,850,278 B1 | 2/2005 | Sakurai et al. | 348/302 |
| 7,209,171 B2 * | 4/2007 | Suzuki et al. | 348/308 |
| 2001/0030701 A1 | 10/2001 | Hiyama et al. | 348/308 |

FOREIGN PATENT DOCUMENTS

| | | |
|---|---|---|
| EP | 0 942 593 | 9/1999 |
| EP | 0 952 730 | 10/1999 |
| JP | 4-61573 | 2/1992 |
| JP | A-09-247538 | 9/1997 |
| JP | 11-103043 | 4/1999 |
| JP | 11-308531 | 11/1999 |
| JP | A-11-355668 | 12/1999 |
| JP | 2000-4403 | 1/2000 |

* cited by examiner

IMAGE PICKUP APPARATUS

This application is a division of application Ser. No. 09/791,544, filed Feb. 26, 2001.

BACKGROUND OF THE INVENTION

1. Field of the Invention

The present invention relates to a solid-state image pickup device having a plurality of pixels each including a photoelectric conversion unit and a plurality of transistors, an image pickup apparatus using the solid-state image pickup device, and a scanning circuit used in the solid-state image pickup device or the like.

2. Related Background Art

In recent years, many studies have enthusiastically been made for image sensors called CMOS image sensors in which a photoelectric conversion signal is read by not a CCD (Charge-Coupled Device) but a MOS transistor. The CMOS image sensor is used particularly for a portable image sensor in terms of easy on-chip integration of a peripheral circuit because of high compatibility with a CMOS logic LSI process, low driving voltage, and low power consumption.

FIG. 1 is an equivalent circuit diagram showing one pixel of a solid-state image pickup device disclosed in, e.g., Japanese Patent Application Laid-Open No. 4-61573 and the periphery of the solid-state image pickup device. As shown in FIG. 1, each pixel of a conventional solid-state image pickup device comprises a photodiode 1 serving as a photoelectric conversion unit, an amplifier MOSFET 2 for amplifying the charges accumulated in the photodiode 1, a transfer MOSFET 3 for transferring charges from the photodiode 1 to the gate of the amplifier MOSFET 2, a selector MOSFET for turning on the amplifier MOSFET 2, a reset MOSFET for resetting the input node of the amplifier MOSFET 2, a vertical signal line 7 to which a signal amplified by the amplifier MOSFET 2 is read out, and a vertical scanning circuit 6 for outputting a control signal for switching the level between high and low levels to the gates of the amplifier MOSFET 2 and transfer MOSFET 3.

In the pixel shown in FIG. 1, the photodiode 1 converts incident light into an electrical signal, and accumulates the electrical signal. When the vertical scanning circuit 6 supplies a high-level control signal to the gate of the transfer MOSFET 3, the charges accumulated in the photodiode 1 are transferred to the amplifier MOSFET 2 at a predetermined timing. The signal amplified by the amplifier MOSFET 2 is read out to the vertical signal line 7.

FIG. 2 is a partial circuit diagram showing a portion for outputting a control signal ΦTX supplied from the vertical scanning circuit 6 to the transfer MOSFET 3. As shown in FIG. 2, the vertical scanning circuit 6 uses, e.g., a CMOS inverter for outputting the control signal ΦTX.

Two transistors constituting the CMOS inverter have a power supply VH for outputting a high-level control signal, and a power supply VL for outputting a low-level control signal. The ON/OFF states of the two transistors are switched to output a signal based on the potentials of these power supplies, and thus the ON/OFF state of the gate of the transfer transistor is switched.

The potential of each power supply is determined in accordance with a source-drain breakdown voltage $V_{DSX}$ of each transistor. For example, when the breakdown voltage $V_{DSX}$ of each transistor is 5 V, the voltage values of the power supplies VH and VL are set to 5 V and 0 V, respectively.

However, charges transferred to the amplifier transistor include a dark current component in the photodiode or transfer transistor. If charges include a large amount of dark current component, the S/N ratio of an amplified signal read out to the vertical signal line decreases. If light is incident on the Si—SiO$_2$ interface of the gate oxide layer of a transistor forming the transfer transistor, charges are generated. These charges are also superposed on charges transferred from the photodiode, resulting in a lower S/N ratio.

To prevent this, a dark current in the transfer transistor must be stopped from being generated when the transfer transistor having a MOS transistor or the like is interposed between the photodiode and the amplifier transistor. To suppress a dark current generated in the transfer transistor, holes are sufficiently accumulated near the control electrode of the MOS transistor while the photodiode accumulates charges.

When holes are sufficiently accumulated near the control electrode of the MOS transistor, even if electron-hole pairs are generated below the gate oxide layer of the transfer MOSFET 3, the electrons quickly recombine with the accumulated holes, so no dark current flows.

To sufficiently accumulate holes near the control electrode of the MOS transistor, channel may be prevented from being formed in the MOS transistor serving as the transfer transistor. However, such the prevention of formation of the channel in the MOS transistor serving as the transfer transistor degrades the charge transfer characteristic from the photodiode. As a result, an afterimage or the like is generated in an obtained image.

A pixel in which a photodiode is depleted to reset the charges in the photodiode immediately after charges are transferred readily suffers an afterimage and must be improved.

In general, the MOS transistor of a transfer transistor, and a MOS transistor which constitutes a reset switch or selector switch for another purpose are often simultaneously formed. For this reason, channel formation also is prevented in the other MOS transistor, and the performance of the transistor other than the transfer transistor decreases.

As the MOS transistor shrinks in feature size, the power supply voltage applied to a circuit decreases. It is therefore not preferable to prevent channel formation in the MOS transistor in this sense.

Another conventional art will be described. FIG. 3 shows part of a conventional scanning circuit. A case in which this scanning circuit is applied to the vertical scanning circuit of the solid-state image pickup device in FIG. 1 will be explained. An arbitrary row in a pixel area is selected by an output ΦSR from a shift register, and control signals ΦSEL and ΦRES are generated by logical operation between the output ΦSR and an external input pulse ΦSEL'. ΦSEL is supplied to a selector MOSFET 4 for turning on an amplifier MOSFET 2 of a pixel, whereas ΦRES is supplied to a reset MOSFET 5 for resetting the input node of the amplifier MOSFET 2. ΦTX is supplied to a transfer MOSFET 3 for transferring charges from a photodiode to the amplifier MOSFET 2. The shift register shifts a scanning pulse to sequentially read out signals in units of rows, finally obtaining a 1-frame image signal.

In the conventional scanning circuit shown in FIG. 3, the shift register and pulse output circuit operate at the same power supply voltage, so a plurality of output control signals ΦSEL and ΦRES are output pulses within the same voltage range. This poses various limitations.

SUMMARY OF THE INVENTION

It is the first object of the present invention to provide an image pickup apparatus having a function of preventing leakage of a dark current generated in a transistor in another pixel to a photoelectric conversion unit while the photoelectric conversion unit accumulates an electrical signal.

It is the second object of the present invention to provide an advanced scanning circuit applied to the above image pickup apparatus.

To achieve the first object, according to an aspect of the present invention, there is provided an image pickup apparatus comprising:

a plurality of pixels each including a photoelectric conversion unit adapted to convert incident light into an electrical signal and accumulate the electrical signal, an amplifier transistor adapted to amplify and output the signal from the photoelectric conversion unit, a transfer transistor adapted to transfer the electrical signal accumulated in the photoelectric conversion unit to the amplifier transistor, and a processing transistor adapted to perform predetermined processing; and a control circuit adapted to set a signal level supplied to a control electrode of the transfer transistor in order to turn off the transfer transistor to be lower than a signal level supplied to a control electrode of the processing transistor in order to turn off the processing transistor.

According to another aspect of the present invention, there is provided an image pickup apparatus comprising:

a plurality of pixels each including a photoelectric conversion unit adapted to convert incident light into an electrical signal and accumulate the electrical signal, an amplifier transistor adapted to amplify and output the signal from the photoelectric conversion unit, a reset transistor adapted to reset a control electrode of the amplifier transistor, and a processing transistor adapted to perform predetermined processing; and a control circuit adapted to set a signal level supplied to a control electrode of the reset transistor in order to turn off the reset transistor to be lower than a signal level supplied to a control electrode of the processing transistor in order to turn off the processing transistor.

According to still another aspect of the present invention, there is provided an image pickup apparatus comprising:

a plurality of pixels each including a photoelectric conversion unit adapted to convert incident light into an electrical signal and accumulate the electrical signal, a first processing transistor adapted to perform a first predetermined processing on the signal from the photoelectric conversion unit and output the signal, a transfer transistor adapted to transfer the electrical signal accumulated in the photoelectric conversion unit to the first processing transistor, and a second processing transistor adapted to perform a second predetermined processing; and a control circuit for setting a signal level supplied to a control electrode of the transfer transistor in order to turn off the transfer transistor to be lower than a signal level supplied to a control electrode of the second processing transistor in order to turn off the second processing transistor.

According to still another aspect of the present invention, there is provided an image pickup apparatus comprising:

a plurality of pixels each including a photoelectric conversion unit adapted to convert incident light into an electrical signal and accumulate the electrical signal, a first processing transistor adapted to perform a first predetermined processing on the signal from the photoelectric conversion unit and output the signal, a reset transistor adapted to supply a reset signal, and a second processing transistor adapted to perform a second predetermined processing; and a control circuit for setting a signal level supplied to a control electrode of the transistor in order to turn off the reset transistor to be lower than a signal level supplied to a control electrode of the second processing transistor in order to turn off the second processing transistor.

According to still another aspect of the present invention, there is provided an image pickup apparatus comprising:

a plurality of pixels each including a photoelectric conversion unit adapted to convert incident light into an electrical signal and accumulate the electrical signal, a first processing transistor which includes a main electrode connected to the photoelectric conversion unit and performs a first predetermined processing, and a second processing transistor which includes a main electrode not connected to the photoelectric conversion unit and performs a second predetermined processing; and a control circuit for setting a signal level supplied to a control electrode of the first processing transistor in order to turn off the first processing transistor to be lower than a signal level supplied to a control electrode of the second processing transistor in order to turn off the second processing transistor.

To achieve the second object, according to still another aspect of the present invention, there is provided a scanning circuit comprising:

a shift register; and pulse output circuits respectively arranged on stages of the shift register to output a plurality of pulses on the basis of a pulse from the shift register, wherein the pulse output circuits include a level conversion circuit adapted to convert a voltage range of the pulse from the shift register, and the pulse output circuits output pulses having different voltage ranges.

The above and other objects and features of the present invention will be apparent from the following description in conjunction with the accompanying drawings.

DETAILED DESCRIPTION OF THE PREFERRED EMBODIMENTS

Preferred embodiments of the present invention will be described in detail below with reference to the accompanying drawings.

Figure 4:
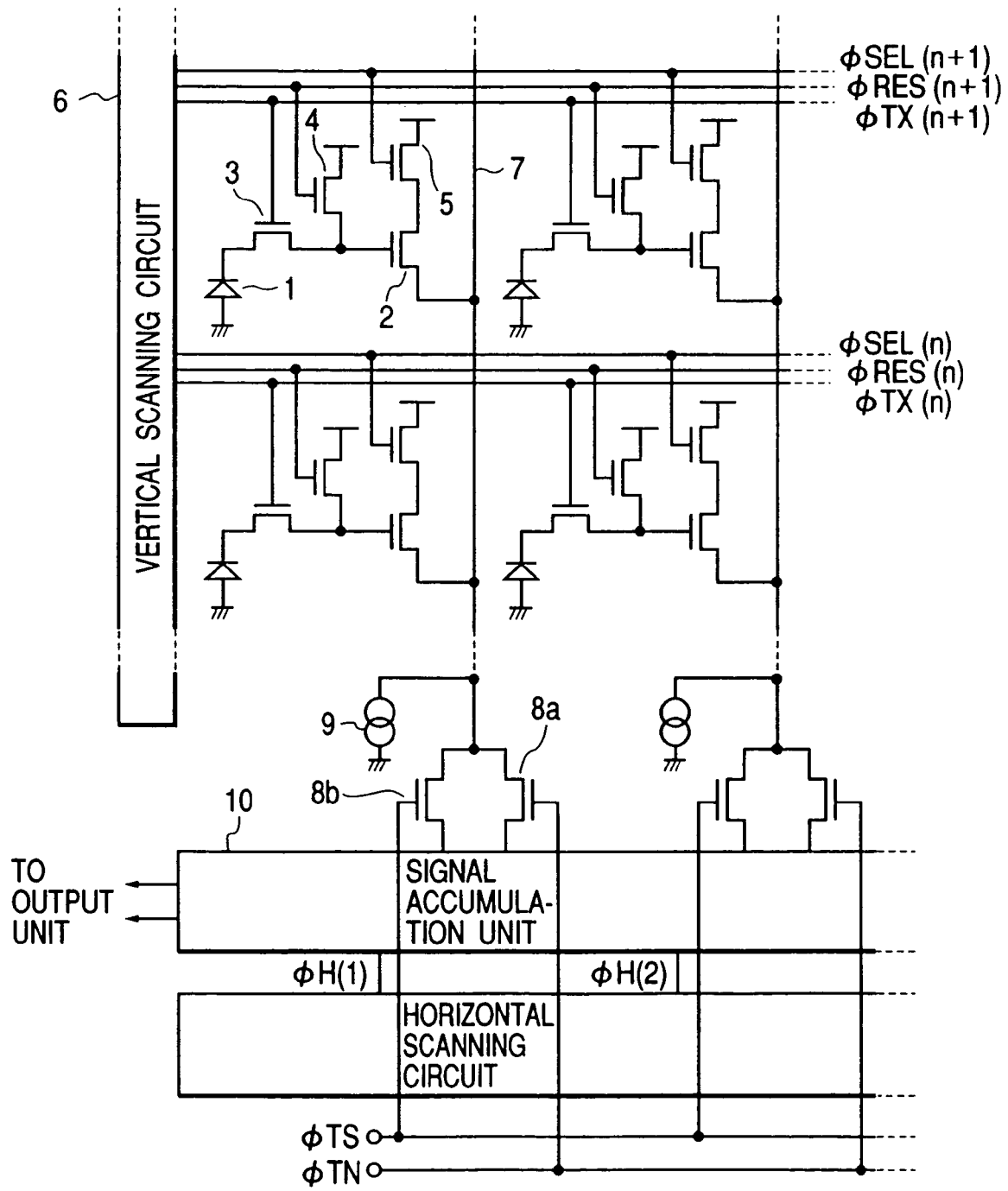
FIG. 4 is an equivalent circuit diagram showing a solid-state image pickup device according to the first embodiment of the present invention.

FIG. 4 is an equivalent circuit diagram showing a solid-state image pickup device according to the first embodiment of the present invention. The solid-state image pickup device shown in FIG. 4 comprises photodiodes 1 serving as photoelectric conversion units, amplifier MOSFETs 2 for amplifying electrical signals converted by the photodiodes 1, transfer MOSFETs 3 for transferring charges from the photodiodes 1 to the gates of the amplifier MOSFETs 2, reset MOSFETs 4 for resetting the gates of the amplifier MOSFETs 2, selector MOSFETs 5 for controlling output/non-output of amplified signals from the amplifier MOSFETs 2 to vertical signal lines 7, and a vertical scanning circuit 6 for outputting a high- or low-level control signal to the control electrodes, i.e., gates of the transfer MOSFETs 3, reset MOSFETs 4, and selector MOSFETs 5.

The solid-state image pickup device shown in FIG. 4 further comprises constant current sources 9 for reading out electrical signals to the corresponding vertical signal lines 7, transfer gates 8a and 8b for removing fixed pattern noise generated in the amplifier MOSFETs 2 or the like, and a signal accumulation unit 10 for accumulating signals input when the transfer gates 8a and 8b are turned on. Note that FIG. 4 shows a layout of 4×4 pixels. However, the number of pixels is not particularly limited, and the pixel layout may be one- or two-dimensional.

Figure 5:
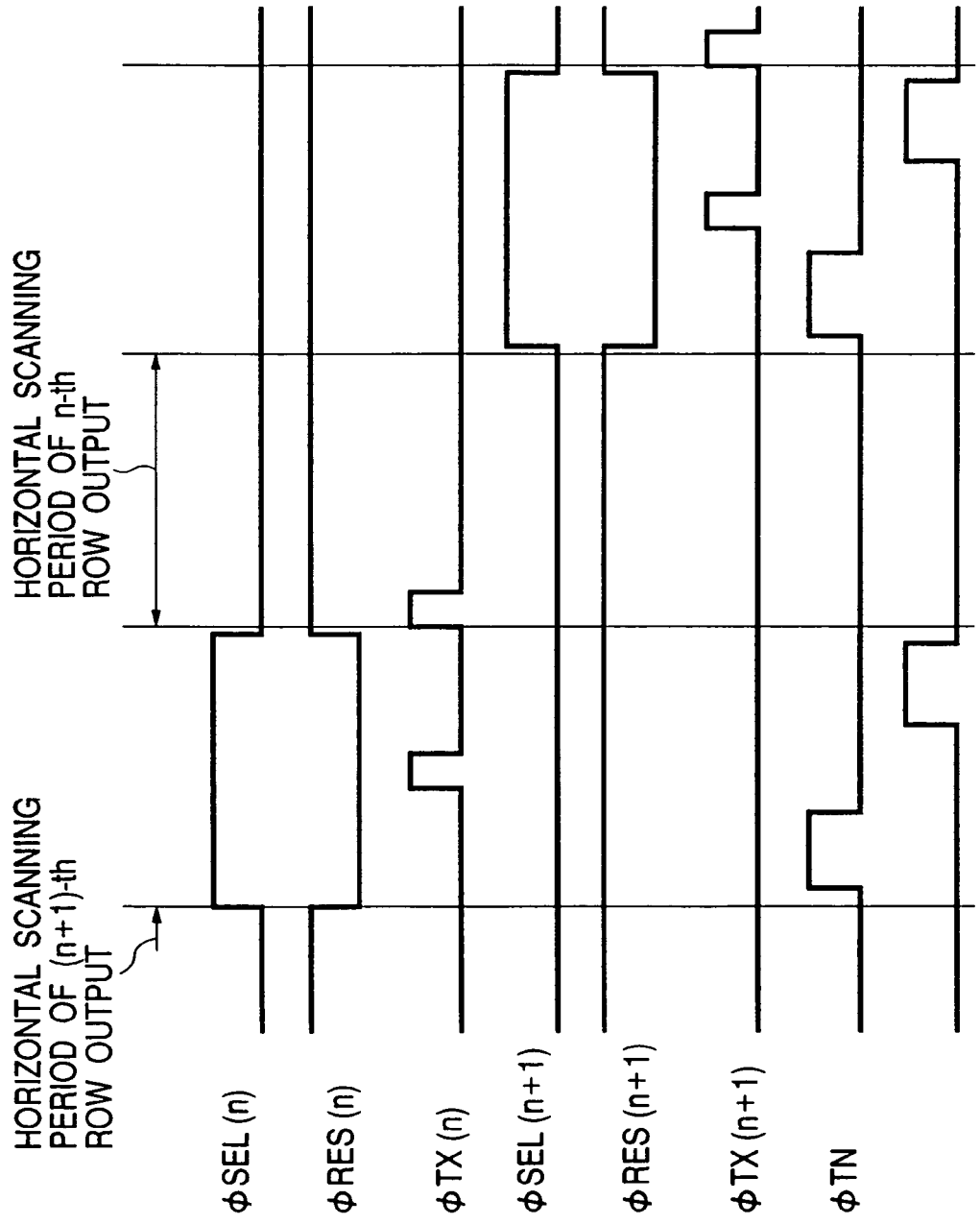
FIG. 5 is a timing chart for driving the solid-state image pickup device in FIG. 4.

FIG. 5 is a timing chart showing selection pulses ΦSEL(n) and ΦSEL(n+1), reset pulses ΦRES(n) and ΦRES(n+1), and transfer pulses ΦTX(n) and ΦTX(n+1) respectively applied to the selector MOSFETs 5, reset MOSFETs 4, and transfer MOSFETs 3 on the n-th and (n+1)-th rows in FIG. 4.

The operation of the solid-state image pickup device in FIG. 4 will be described with reference to FIG. 5. The selection and transfer pulses ΦSEL and ΦTX are set to low level to accumulate charges in the photodiodes 1. During charge accumulation, the reset pulses ΦRES are set to high level to reset the gates of the amplifier MOSFETs 2. Thus, the inputs of the amplifier MOSFETs 2 are reset.

The reset pulse ΦRES(n) output from the vertical scanning circuit 6 to pixels on the n-th row is set to low level, and the row selection pulse ΦSEL(n) is set to high level. Then, a source follower circuit made up of pixels on the n-th row and the constant current source 9 is turned on to output a drain current from the amplifier MOSFET 2 of each pixel to the vertical signal line 7.

To remove fixed pattern noise, a transfer pulse ΦTN applied to the transfer gate 8a changes to high level to transfer a reset output to the signal accumulation unit 10 via the transfer gate 8a. After the transfer pulse ΦTN changes to low level, the transfer pulse ΦTX(n) changes to high level to turn on the gates of the transfer MOSFETs 3. Electrical signals accumulated in the photodiodes 1 are transferred to their amplifiers MOSFET 2 via the transfer MOSFETs 3. Since the selection pulse ΦSEL(n) stays at high level, amplified signals based on the transferred electrical signals are read out to the vertical signal line 7.

The transfer pulse ΦTX(n) changes to low level to complete transfer of the electrical signals from the photodiodes 1 to the amplifiers MOSFET 2. After that, a transfer pulse ΦTS changes to high level to transfer the electrical signals read out to the vertical signal line 7 to the signal accumulation unit 10 via the transfer gate 8b.

In the signal accumulation unit 10, the difference between the signal input when the transfer gate 8a is turned on, and the signal input when the transfer gate 8b is turned on is calculated by a differential means (not shown), and each input signal is output at a timing so as to remove fixed pattern noise. The differential means calculates the difference between the input signals to remove fixed pattern noise.

Thereafter, the selection pulse ΦSEL(n) changes to low level, and both the transfer pulse ΦTX(n) and reset pulse ΦRES(n) change to high level to remove charges left in the photodiodes 1 upon previously reading out charges from the photodiodes 1. After the photodiodes 1 are reset, the transfer pulse ΦTX(n) changes to low level. Then, the photodiodes 1 start accumulating charges. By the same procedures, charges are read out from and accumulated in pixels on the (n+1)-th row.

By this operation, the charge accumulation period of the photodiode 1 is defined by the period from a time when the photodiode 1 is reset to a time when the transfer pulse ΦTX changes to high level. In other words, the transfer pulse ΦTX stays at low level while the photodiode 1 accumulates charges.

Figure 6:
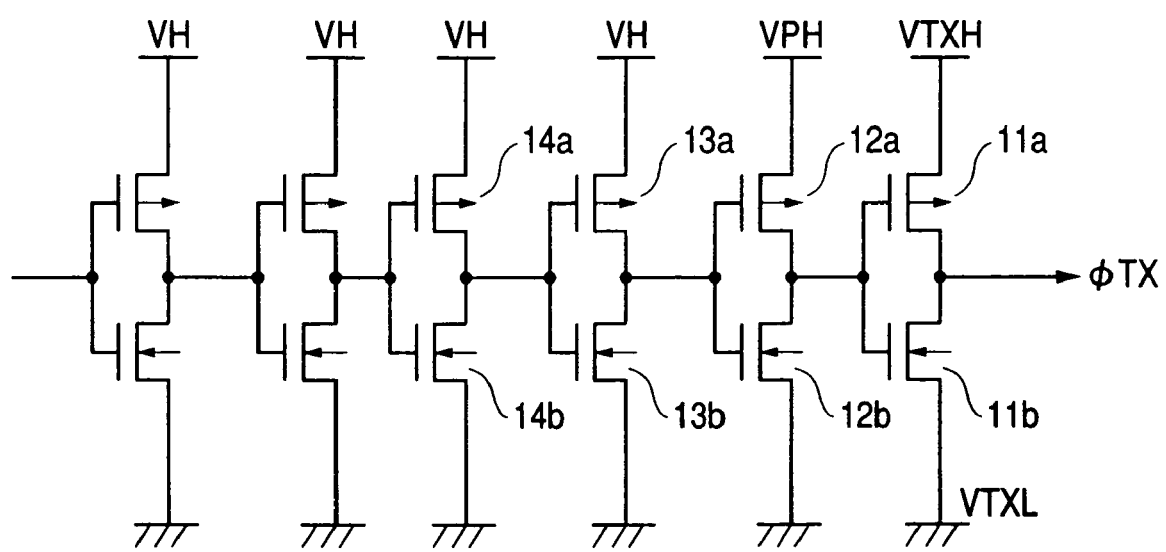
FIG. 6 is a circuit diagram showing part of the internal arrangement of a vertical scanning circuit in FIG. 4.

FIG. 6 is a circuit diagram showing part of a portion for outputting the transfer pulse ΦTX of the vertical scanning circuit 6 shown in FIG. 4. As shown in FIG. 6, the actual vertical scanning circuit 6 has, CMOS inverters which serve as complementary inverters each made up of two transistors 11a and 11b, 12a and 12b, . . . , and which correspond in number to pixel rows.

A power supply VTXH connected to the transistor 11a is selected when the transfer pulse ΦTX applied to the gate of the transfer MOSFET 3 is changed to high level. A power supply VTXL connected to the transistor 11b is selected when the transfer pulse ΦTX is changed to low level.

A power supply VPH connected to the transistor 12a is selected when a signal applied to a CMOS inverter made up of the transistors 11a and 11b is changed to high level. GND connected to the transistor 12b is selected when the signal applied to the CMOS inverter made up of the transistors 11a and 11b is changed to high level.

A power supply VH connected to transistors 13a and 14a is selected when the signal supplied to CMOS inverters respectively made up of the transistors 12a and 12b and the transistor 13a and a transistor 13b is changed to high level. GND connected to the transistor 13b and a transistor 14b is selected when the signal supplied to the CMOS inverters respectively made up of the transistors 12a and 12b and the transistors 13a and 13b is changed to high level.

The potentials of the power supplies VTXH, VTXL, VPH, VH, and GND are determined in accordance with the source-drain breakdown voltage $V_{DSX}$ of the transistors 11a, 11b, and the like. For example, when the source-drain breakdown voltage $V_{DSX}$ of the transistors 11a, 11b, and the like is 5 V, the voltage value of the power supply VH connected to the transistors 13a, 13b, 14a, 14b, . . . is set to, e.g., 5 V.

The voltage values of the power supplies VPH, VTXH, and VTXL are set to, e.g., 3.3 V, 5 V, and −1 V, respectively. Note that it is preferable that the voltage value of VTXH be set to 4 V so as to suppress the voltage difference between the power supplies VTXH and VTXL within 5 V as the source-drain breakdown voltage $V_{DSX}$, because no load is applied to the transistors 11a and 11b in that case.

In the first embodiment, a voltage applied to the CMOS inverter made up of the transistors 11a and 11b is set to 3.3 V for high level and to 0 V for low level. This prevents the gate oxide layer of the CMOS inverter made up of the transistors 11a and 11b from receiving a voltage larger than 5 V when the vertical scanning circuit 6 is driven. Accordingly, the durability of the vertical scanning circuit increases.

The transfer pulse ΦTX output from the vertical scanning circuit 6 applies a voltage of 4 V to the gate of the transfer MOSFET 3 when the transfer pulse ΦTX is at high level, and a voltage of −1 V to the gate of the transfer MOSFET 3 when the transfer pulse ΦTX is at low level. When, e.g., a voltage of −1 V is applied to the gate of the transfer MOSFET 3, holes are accumulated below the gate oxide layer of the transfer MOSFET 3.

Even if electron-hole pairs are generated below the gate oxide layer of the transfer MOSFET 3, the generated electrons quickly recombine with the accumulated holes, and no electrons are accumulated below the gate oxide layer of the transfer MOSFET 3, and no dark current therefore flows. An image obtained by the solid-state image pickup device of this embodiment is not degraded by the dark current.

In the first embodiment, the vertical scanning circuit 6 comprises complementary inverters, but may comprise a logic circuit having logic elements such as NAND elements or NOR elements.

Figure 1:
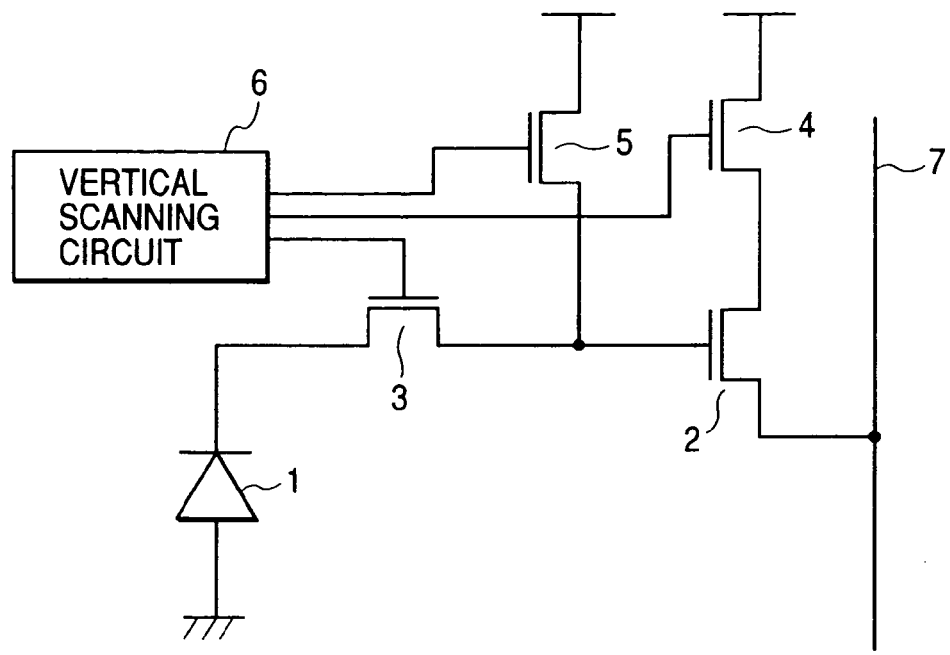
FIG. 1 is an equivalent circuit diagram showing a conventional solid-state image pickup device.
Figure 2:
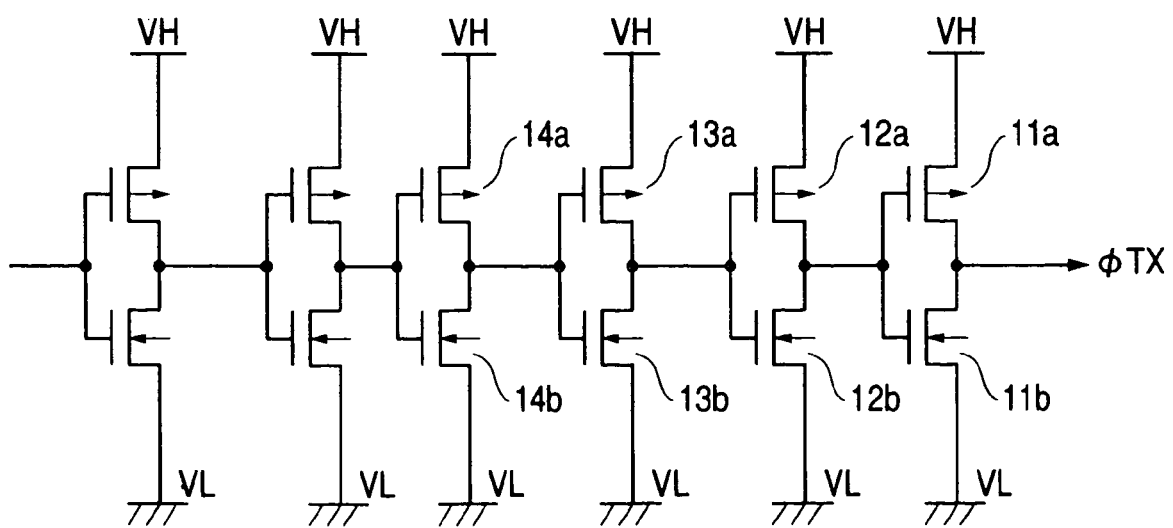
FIG. 2 is a partial circuit diagram showing a portion for outputting a control signal supplied from a vertical scanning circuit to a transfer MOSFET.
Figure 3:
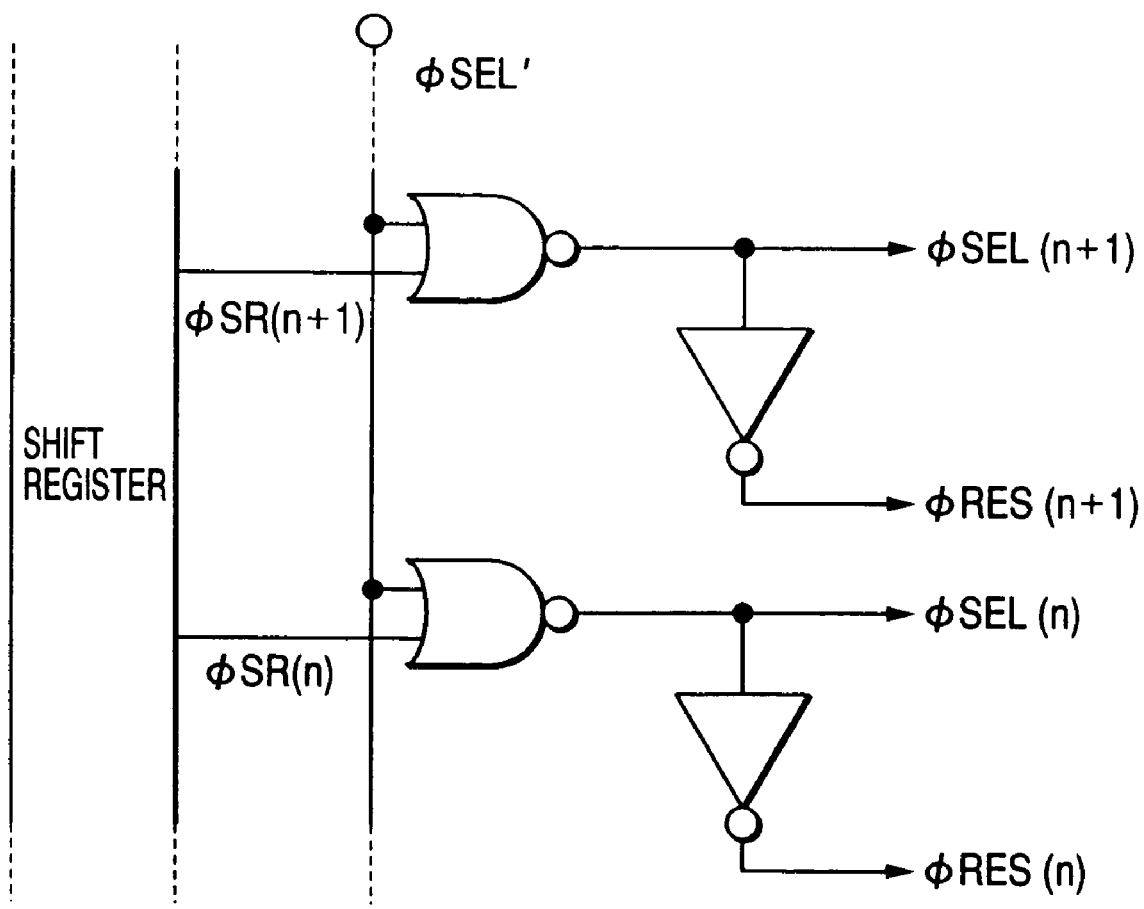
FIG. 3 is a circuit diagram showing a conventional scanning circuit.
Figure 7:
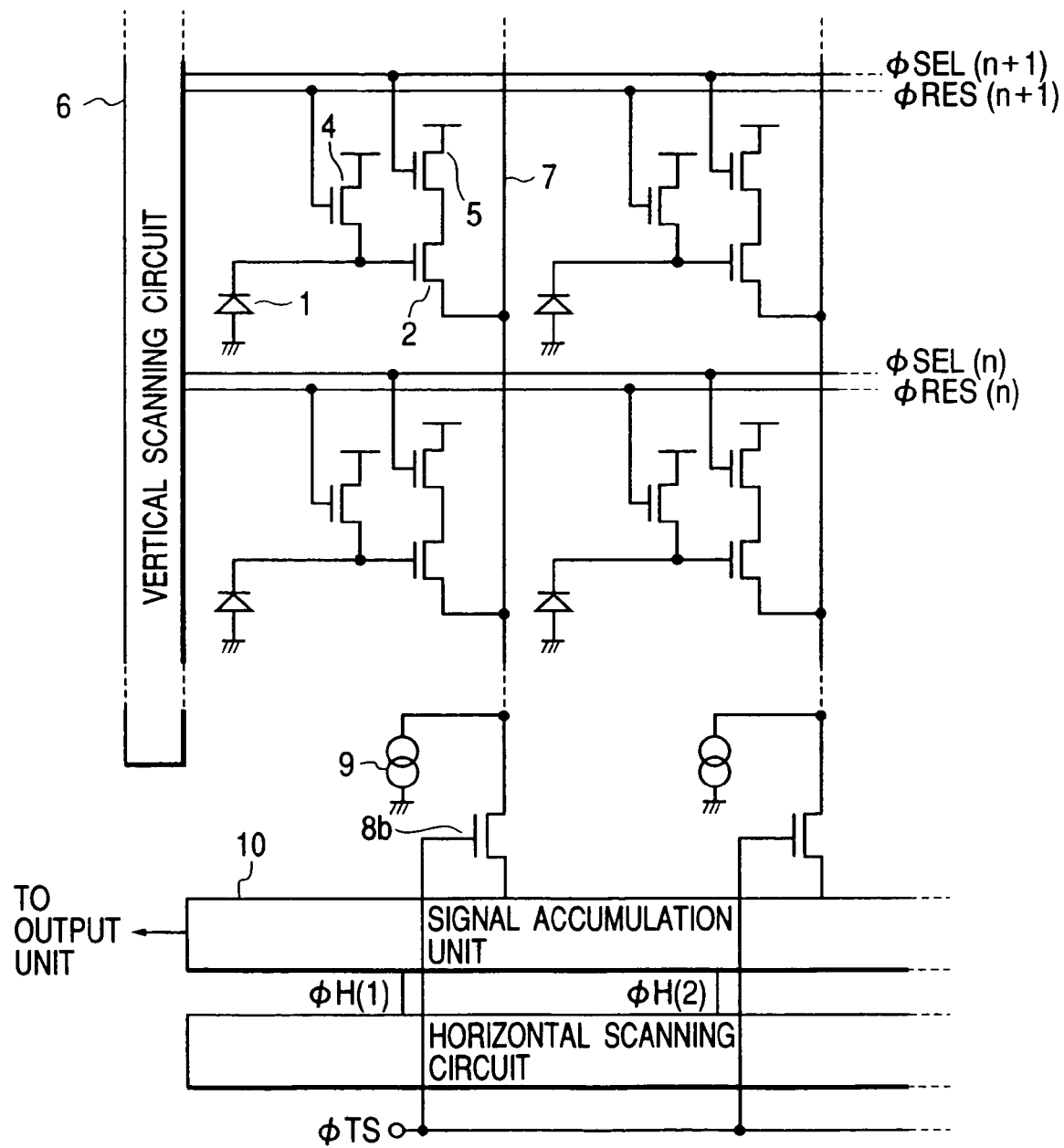
FIG. 7 is an equivalent circuit diagram showing a solid-state image pickup device according to the second embodiment of the present invention.

FIG. 7 is an equivalent circuit diagram showing a solid-state image pickup device according to the second embodiment of the present invention. The solid-state image pickup device shown in FIG. 7 comprises a plurality of pixels not having any transfer MOSFET 3 (FIG. 1). This eliminates the necessity of the transfer gate 8a for removing fixed pattern noise generated by turning on/off the transfer MOSFET 3. In FIG. 7, the same reference numerals as in FIG. 4 denote the same parts.

Figure 8:
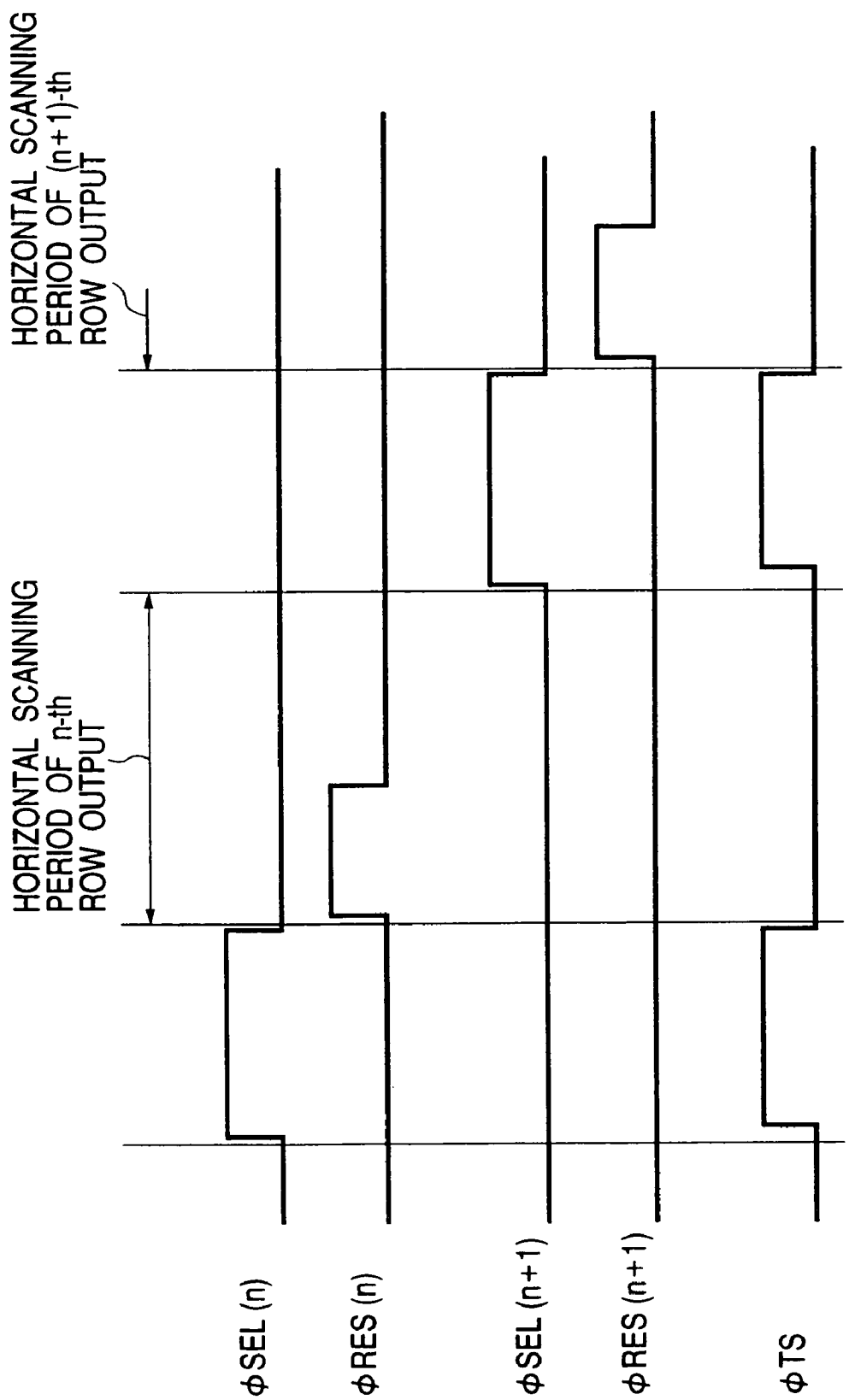
FIG. 8 is a timing chart for driving the solid-state image pickup device in FIG. 7.

FIG. 8 is a timing chart showing the operation of the solid-state image pickup device in FIG. 7, and corresponds to FIG. 5 in the first embodiment. The operation of the solid-state image pickup device shown in FIG. 7 will be explained with reference to FIG. 8.

In the solid-state image pickup device shown in FIG. 7, a row selection pulse ΦSEL(n) changes to high level while a reset pulse ΦRES(n) output from a vertical scanning circuit 6 to pixels on the n-th row is at low level. A source follower circuit made up of pixels on the n-th row and a corresponding constant current source 9 is turned on to output signals amplified based on charges from photodiodes 1 from the drains of amplifier MOSFETs 2 to a corresponding vertical signal line 7.

A transfer pulse ΦTS changes to high level to accumulate the amplified signals output to the vertical signal line 7 in a signal accumulation unit 10 via a transfer gate 8b. Then, the selection pulse ΦSEL(n) and transfer pulse ΦTS change to low level to complete read of charges in the pixels. The reset pulse ΦRES(n) changes to high level to reset charges left in the photodiodes 1 and the gates of the amplifier MOSFETs 2. By the same procedures, electrical signals are read out from pixels on the (n+1)-th row.

In the second embodiment, similar to the first embodiment, the charge accumulation period of the photodiode 1 is defined by the period from a time when the photodiode 1 is reset to a time when the transfer pulse ΦTX changes to high level. However, the second embodiment does not adopt any transfer MOSFET 3, so the reset pulse ΦRES remains at low level during the charge accumulation period of the photodiode 1.

Similar to the first embodiment, holes are accumulated below the gate oxide layer of the reset MOSFET 4 during the charge accumulation period of the photodiode 1 because the potentials of power supplies connected to transistors 11a and 11b constituting a CMOS converter in the vertical scanning circuit 6 are respectively set to, e.g., 4 V and −1 V when the source-drain breakdown voltage $V_{DSX}$ of each MOSFET in a pixel is, e.g., 5 V.

Thus, the second embodiment prevents an image obtained similarly to the first embodiment from degrading owing to a dark current. Moreover, the second embodiment can decrease the number of MOSFETs included in a pixel, and downsize the chip. Charges left in the photodiode 1 or the like can be removed independently of read of charges from a pixel.

The second embodiment adopts a plurality of pixels not having any transfer MOSFET 3 (FIG. 1). To the contrary, if a transistor is formed between the transfer MOSFET 3 and the photodiode 1, the level of a signal supplied to the gate of this transistor to turning it off is set lower than that of a signal supplied to the gate of another transistor in turning it off.

In each embodiment of the present invention described above, MOS transistors are used for a transfer transistor, amplifier transistor, selector transistor, and reset transistor. Alternatively, other transistors, e.g., bipolar transistors may be used.

In the following embodiments, a MOS field effect transistor will be referred to as a MOSFET.

Figure 9:
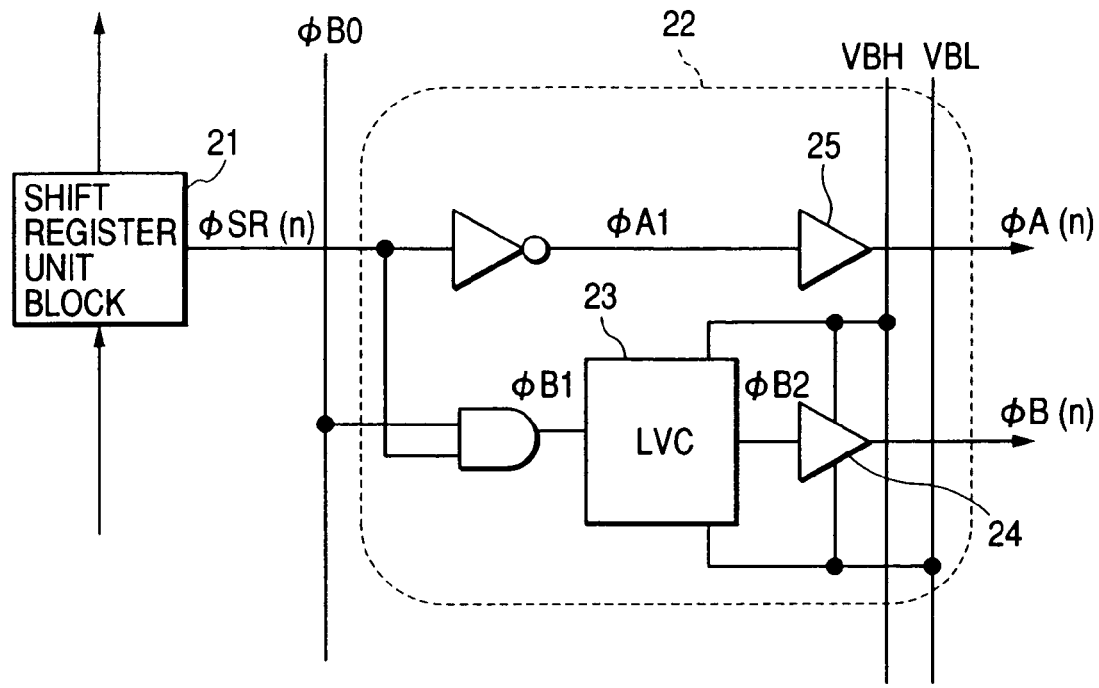
FIG. 9 is a diagram showing the unit block of a scanning circuit according to the third embodiment of the present invention.

The third embodiment of the present invention concerns a scanning circuit used in a solid-state image pickup device or the like. FIG. 9 shows a scanning circuit according to the third embodiment of the present invention. FIG. 9 shows the unit block of the n-th stage of the scanning circuit comprised of a plurality of stages. The scanning circuit is constituted by connecting pluralities of shift register unit blocks 21 and pulse output circuits 22. Each pulse output circuit 22 receives an output ΦSR(n) from a corresponding shift register unit block 21 and an external input pulse ΦB0, and generates output pulses ΦA(n) and ΦB(n). In this case, ΦSR(n), ΦB0, and ΦA(n) are pulses using a common positive power supply VDD for high level and a common negative power supply VSS for low level, whereas ΦB(n) is a pulse using VBH for high level and VBL for low level. A process of generating ΦB(n) will be explained. ΦB1 which is logical product of ΦSR(n) and ΦB0 is input to a level conversion circuit 23 where the ΦB1 having the voltage range of VDD to VSS is converted into a pulse ΦB2 having the voltage range of VBH to VBL. ΦB2 is input to a buffer 24 and finally output as the output pulse ΦB(n). As the buffer 24 operates by the two power supplies VBH and VBL, ΦB(n) is a pulse having the voltage range of VBH to VBL. On the other hand, Φ(n) is generated by inputting ΦA1 as inverted ΦSR(n) to a buffer and outputting ΦA1 as the final output pulse Φ(n). The level of the pulse voltage range is not converted during the generation process of the pulse ΦA(n). Since the level conversion circuit 23 is formed in the pulse output circuit 22, the output pulses ΦA(n) and ΦB(n) having different voltage ranges can be generated, and thus special circuit operation can be attained in a circuit to be scanned. In addition, a single shift register suffices, which reduces the chip area.

Figure 10:
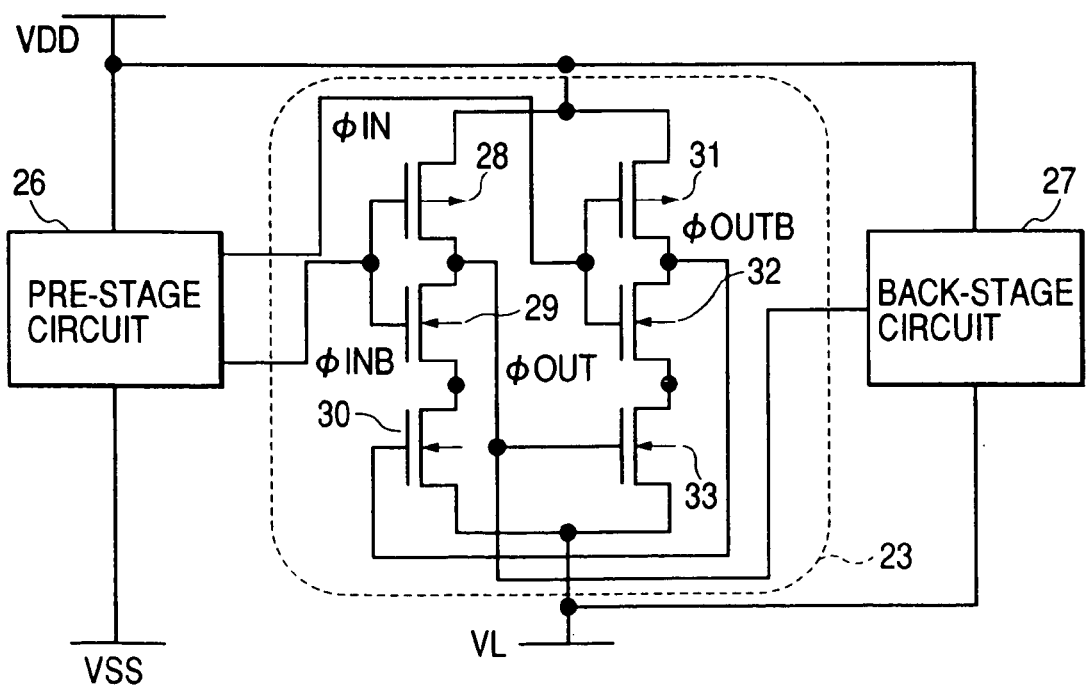
FIG. 10 is a diagram showing the unit block of a scanning circuit according to the fourth embodiment of the present invention.

The fourth embodiment of the present invention is directed to a scanning circuit used in a solid-state image pickup device or the like. FIG. 10 is a level conversion circuit in the scanning circuit. A pre-stage circuit 26 which operates on positive and negative power supplies VDD and VSS is a logic circuit including at least a shift register unit block. A back-stage circuit 27 is a logic circuit which operates on the positive power supply VDD and a negative power supply VL, and generates a final output pulse. When a level conversion circuit 23 has a sufficient drivability, the back-stage circuit 27 can be omitted. The voltages of the two negative power supplies are set to have a relationship VSS>VL.

An inverted input ΦINB input from the pre-stage circuit 26 is supplied to the input gate of an inverter made up of a PMOS 28 and NMOS 29. An output ΦOUTB which is in phase with ΦINB but provided after level conversion is fed back to the gate of an NMOS 30 serially-connected between the inverter and the negative power supply VL. The low level of ΦINB is VSS, which is higher than VL. If the inverter is a simple CMOS inverter, the NMOS 29 is not completely turned off, and a punch-through current undesirably flows. This punch-through current is shielded in the present embodiment because the level conversion circuit 23 of the fourth embodiment is serially-connected to the NMOS 30 to which ΦOUTB using VL for low level is fed back. Also in a CMOS inverter made up of a PMOS 31 and NMOS 32 which receive a positive input ΦIN, a punch-through current is shielded by the same principle by connecting serially an NMOS 33 and inputting ΦOUT to the gate of the NMOS 33. An increase in power consumption by the punch-through current can be prevented by forming a punch-through current suppression circuit made up of the NMOS 30 and a PMOS 31 in the level conversion circuit 23. Even if the level changes on the positive power supply side, a punch-through current can be suppressed by the same circuit arrangement as in the fourth embodiment. The punch-through current suppression effect becomes more important as the number of stages of the scanning circuit becomes larger, like a scanning circuit for a multi-pixel solid-state image pickup device.

Figure 11:
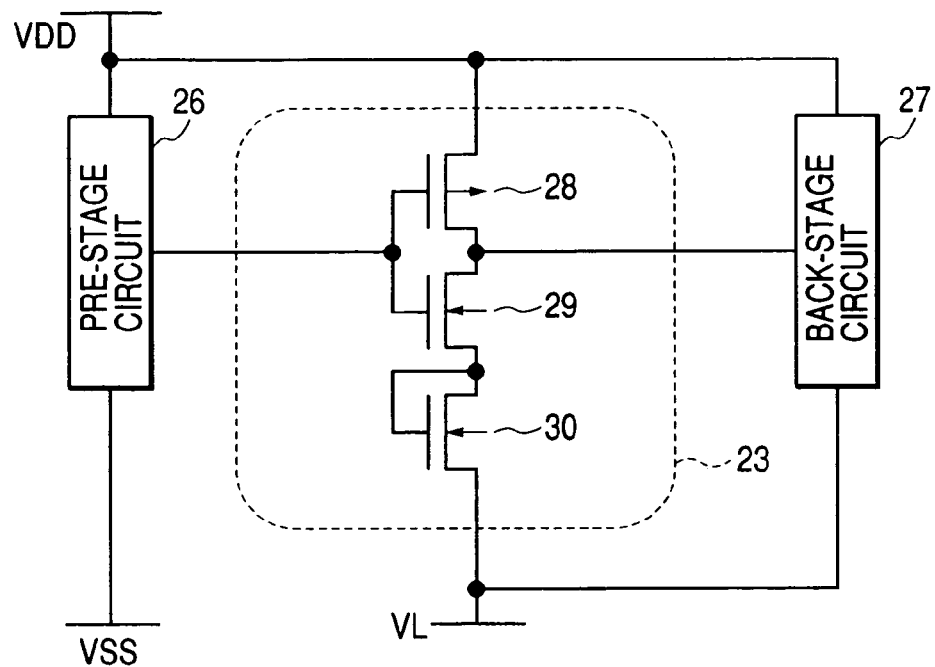
FIG. 11 is a diagram showing the unit block of a scanning circuit according to the fifth embodiment of the present invention.
Figure 12:
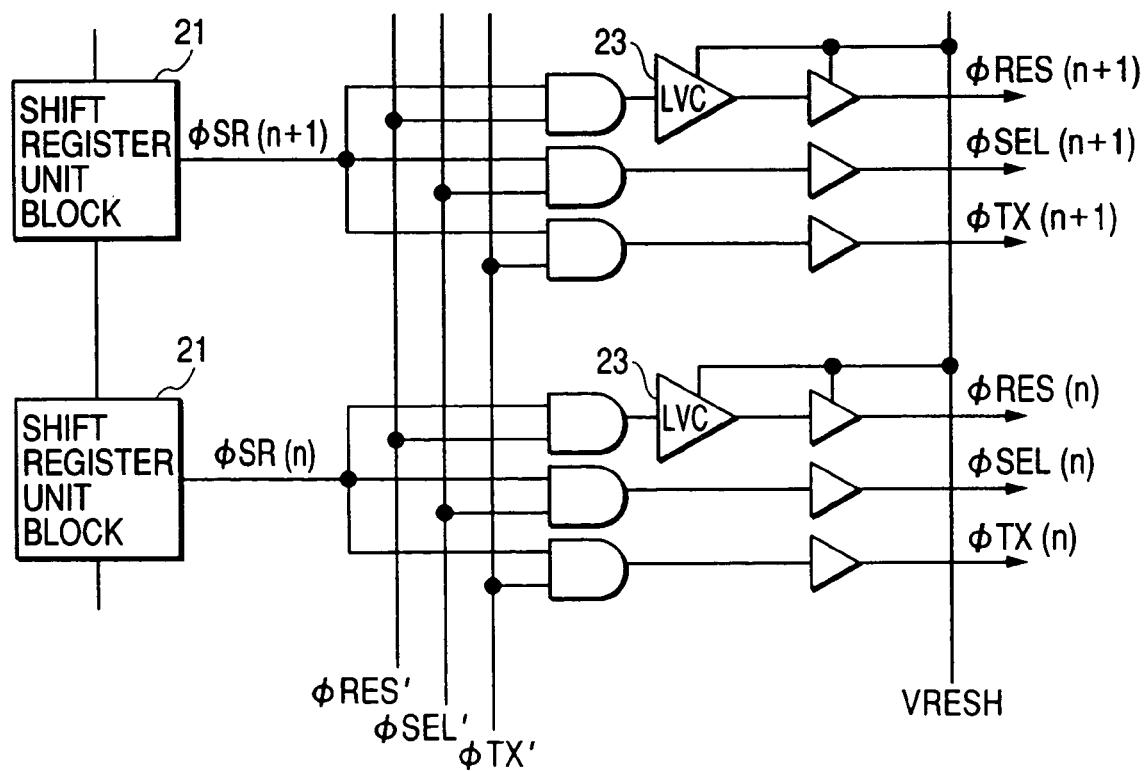
FIG. 12 is a diagram showing two unit blocks of a scanning circuit according to the sixth embodiment of the present invention.
Figure 13:
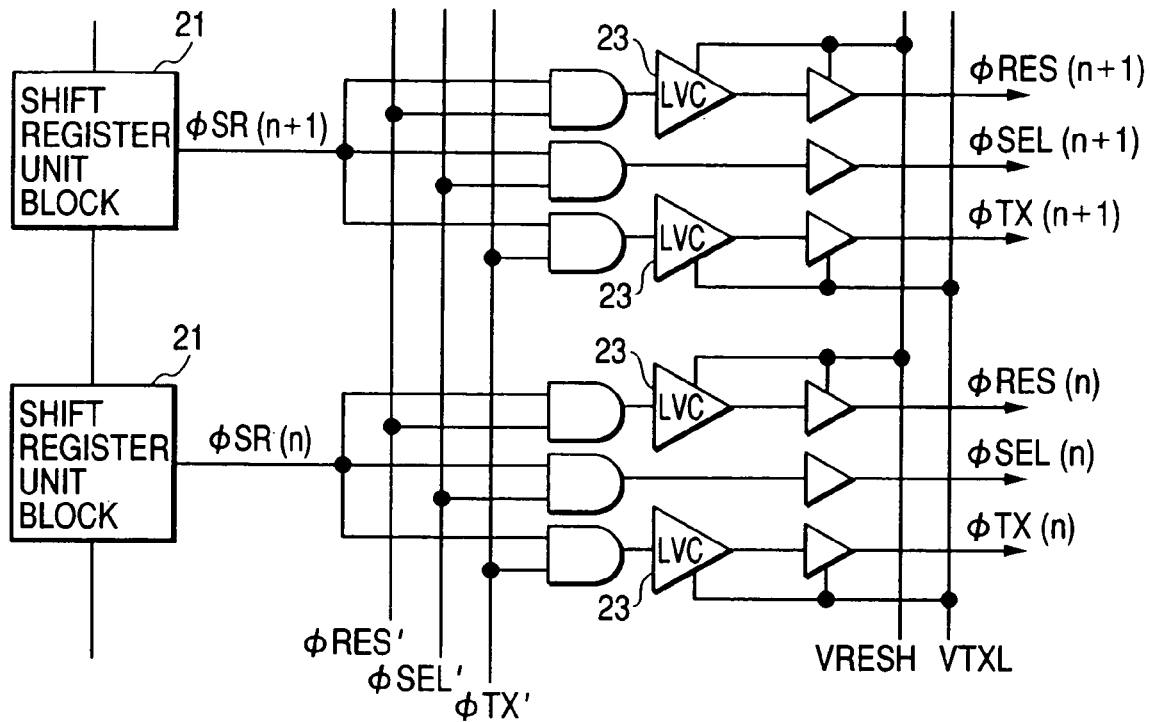
FIG. 13 is a diagram showing two unit blocks of a scanning circuit according to the seventh embodiment of the present invention.
Figure 17A:
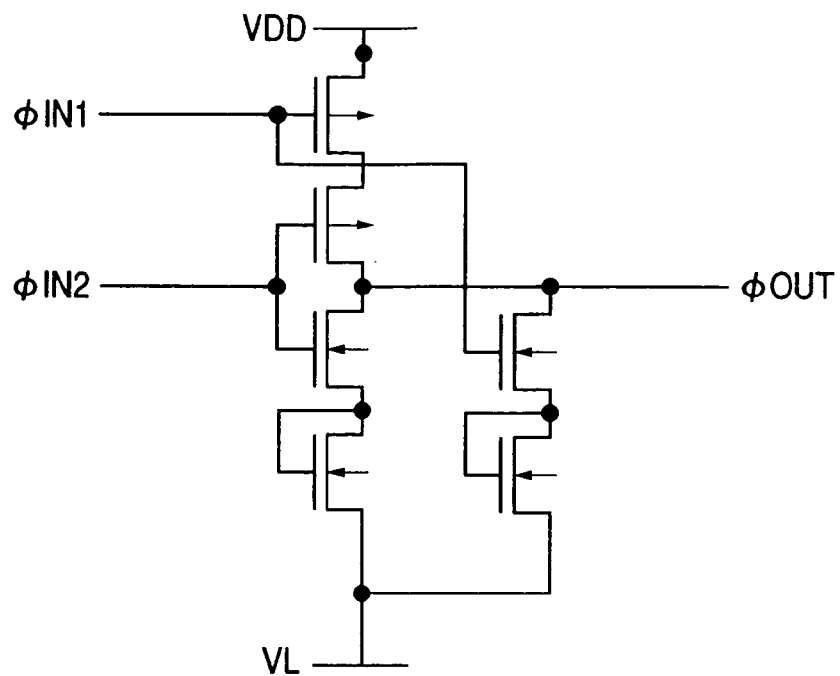
FIGS. 17A and 17B are diagrams each showing the level conversion circuit of a scanning circuit identical to that of the scanning circuit according to the fifth embodiment of the present invention.
Figure 17B:
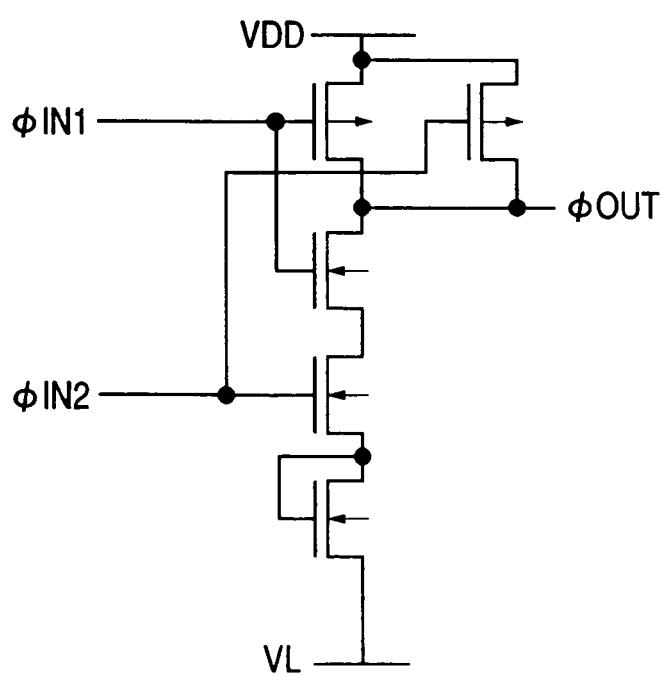

The fifth embodiment of the present invention is related to a scanning circuit used in a solid-state image pickup device or the like. FIG. 11 shows a level conversion circuit in the scanning circuit. The level conversion circuit in the scanning circuit of the fourth embodiment exhibits high punch-through current suppression effect but requires a feedback line, resulting in a large-area scanning circuit. The fifth embodiment of the present invention solves this problem. A punch-through suppression circuit is an NMOS 30 having a gate and drain serially-connected between an inverter made up of a PMOS 28 and NMOS 29, and a negative power supply VL. The NMOS 30 serves as a resistance to a punch-through current. Because of a small number of elements and the absence of a feedback line, both the chip area reduction effect and punch-through suppression effect can be achieved. Note that the level conversion circuit of the fifth embodiment is an inverter. According to the present invention, NAND and NOR which are derived gates based on an inverter can also be constituted as shown in FIGS. 17A and 17B.

Figure 14:
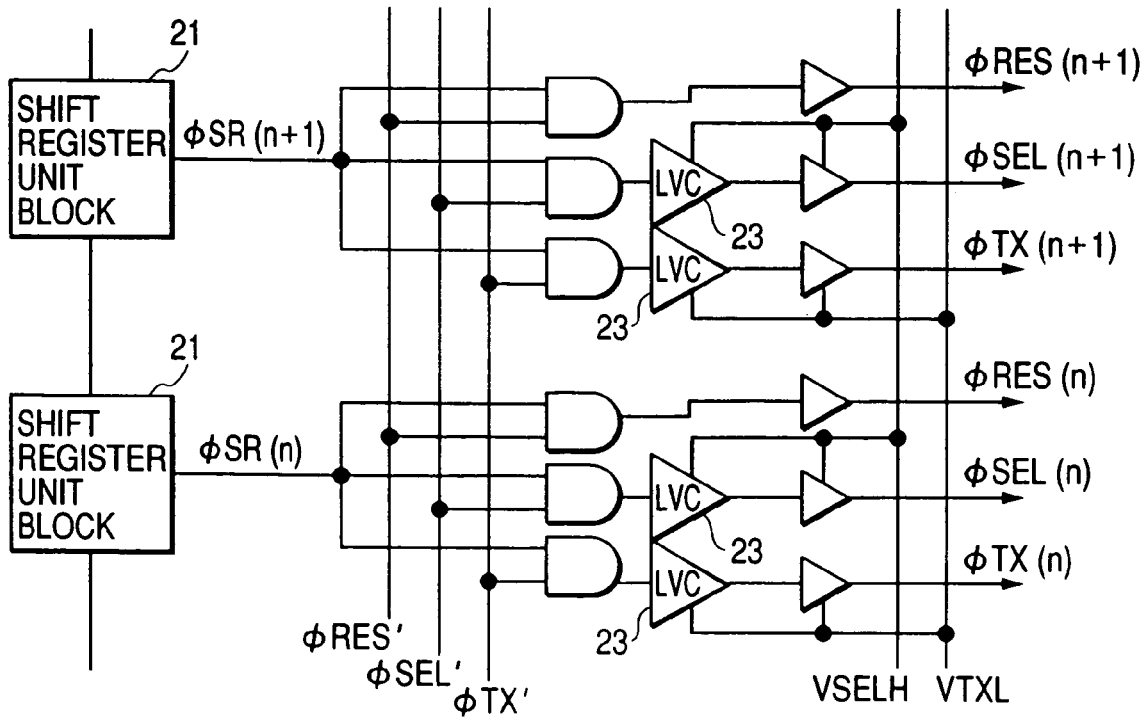
FIG. 14 is a diagram showing two unit blocks of a scanning circuit according to the eighth embodiment of the present invention.
Figure 15:
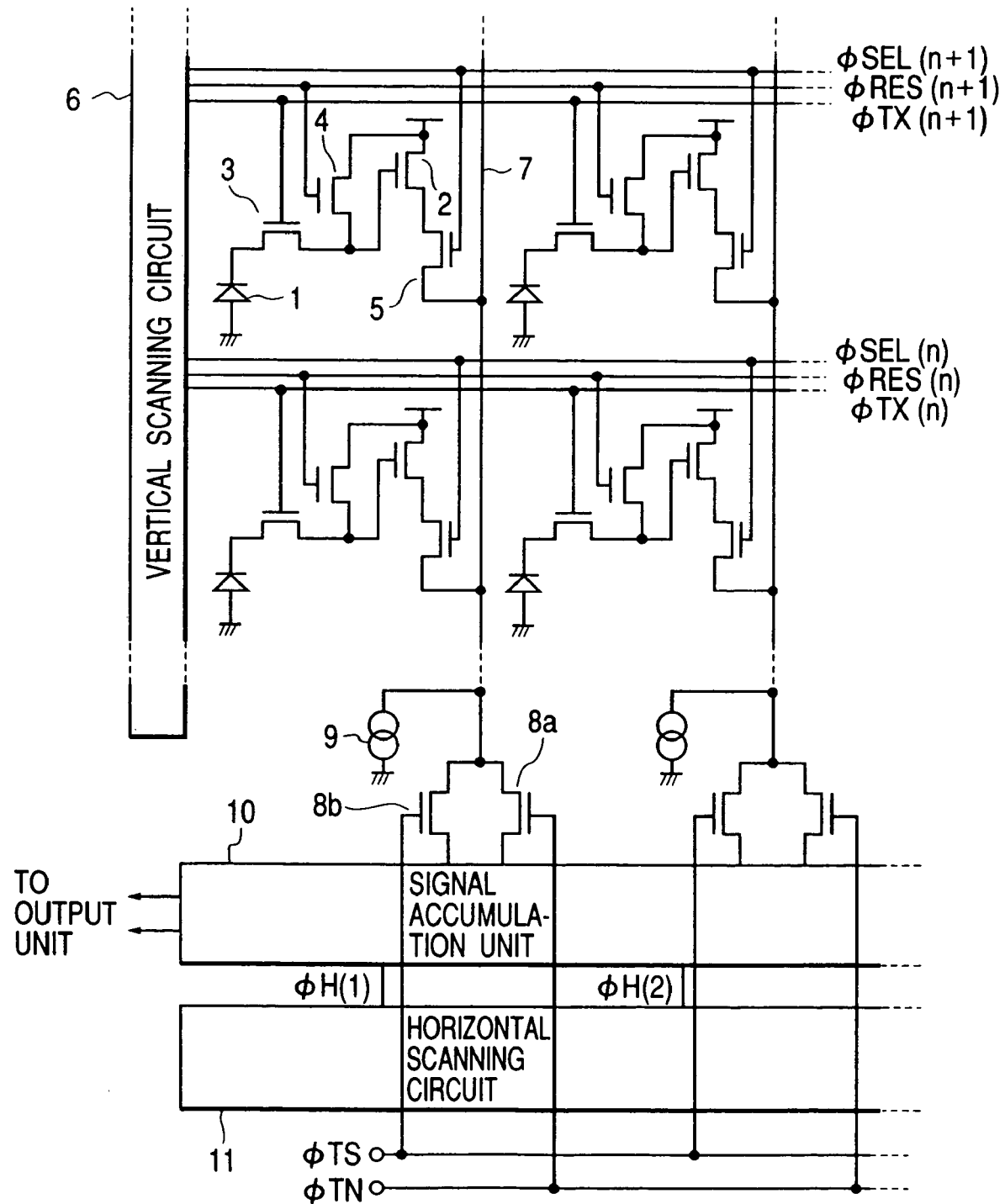
FIG. 15 is a diagram showing a sensor common to the solid-state image pickup devices according to the sixth and seventh embodiments of the present invention.

In the sixth embodiment of the present invention, the scanning circuit described in each of the third to fifth embodiments is applied to the vertical scanning circuit of a solid-state image pickup device shown in FIG. 14. This arrangement can improve the dynamic range of the solid-state image pickup device. FIG. 15 shows a layout of 4×4 unit pixels. However, the number of pixels is not especially limited, and the layout may not be two-dimensional.

Figure 18:
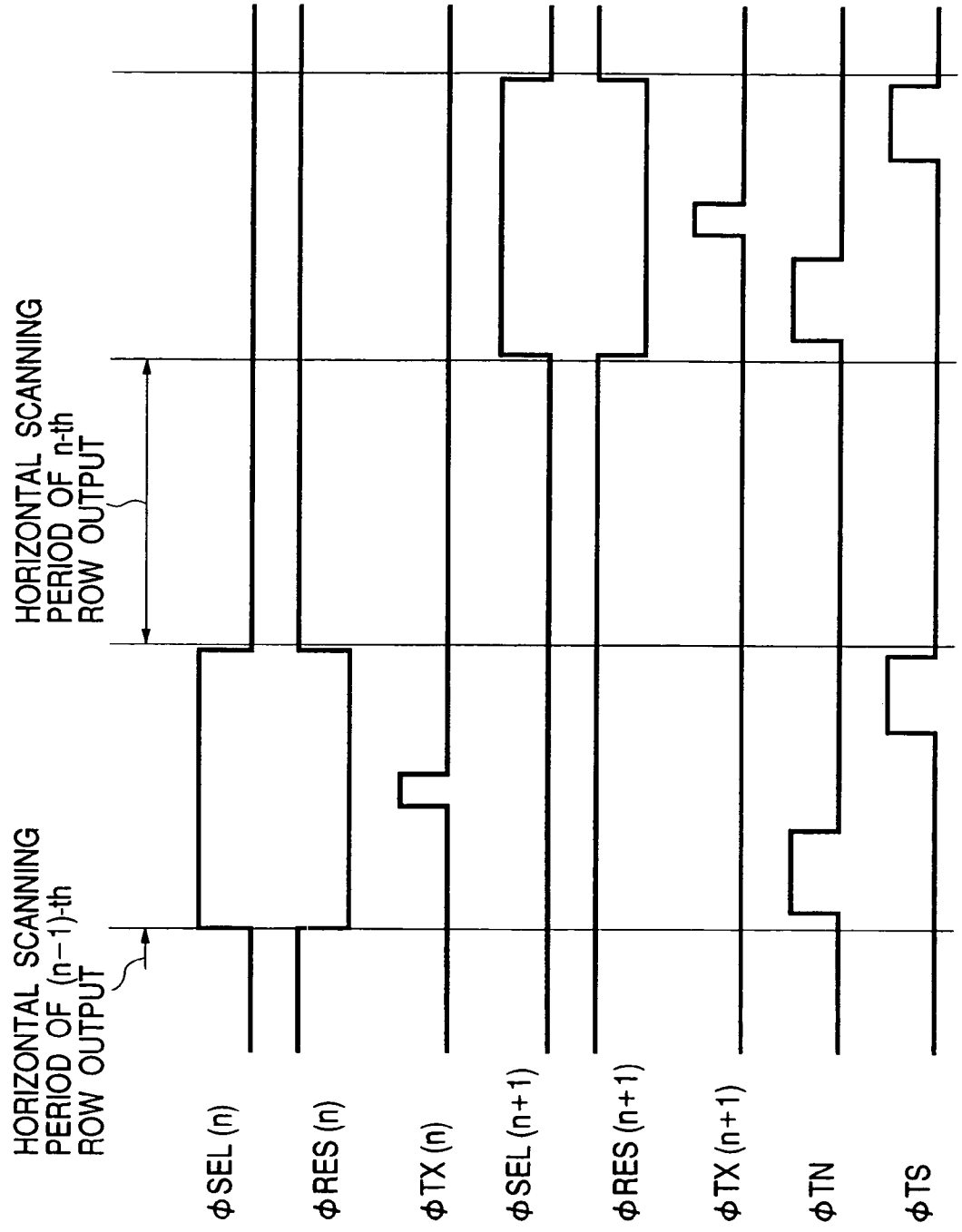
FIG. 18 is a timing chart showing some of driving timings in driving the solid-state image pickup device according to the sixth embodiment.

In each unit pixel, a photodiode 1 as a photoelectric conversion unit, an amplifier MOSFET 2 for amplifying a signal generated in the photoelectric conversion unit, and a transfer MOSFET 3 for transferring signal charges from the photodiode 1 to the input of the amplifier MOSFET 2 are connected as shown in FIG. 15. The unit pixel further comprises a reset MOSFET 4 for resetting the input of the amplifier MOSFET 2, and a selector MOSFET 5 for turning on/off the output of the pixel. The operation of the solid-state image pickup device will be described with reference to driving pulse timings in FIG. 18. In the solid-state image pickup device of the sixth embodiment, a row selection pulse ΦSEL changes to high level on each row basis by a vertical scanning circuit 6, a source follower circuit made up of pixels on a given row and a corresponding constant current source 9 is turned on, and a corresponding output appears on a vertical signal line 7. During the accumulation period, a reset pulse ΦRES is at high level, and the input of the amplifier MOSFET 2 is reset. During the pixel selection period, the reset MOSFET 4 is OFF, and the input of the amplifier MOSFET 2 is in a floating state. To remove fixed pattern noise, an output immediately after reset is stored in a signal accumulation unit 10 via a transfer gate 8a. Subsequently, a transfer pulse ΦTX changes to high level to transfer optical signal charges from the photodiode 1 to the input of the amplifier MOSFET 2. An output after signal transfer is stored in the signal accumulation unit 10 via a transfer gate 8b. By calculating the difference between the output immediately after reset and the output after signal transfer, fixed pattern noise can be removed.

The dynamic range in the pixel of the solid-state image pickup device will be considered. Letting VRESH be the high gate level of the reset MOSFET 4, Vth be the threshold of the MOSFET, and VDD be the common positive power supply including a pixel source follower power supply, the reset level which defines the upper limit of the dynamic range is given by VRESH−Vth when the reset MOSFET 4 performs reset operation in a pentode region, i.e., VRESH−Vth<Vdd holds. When the reset MOSFET 4 performs reset operation in a triode region, i.e., VRESH−Vth>VDD holds, the reset level is VDD. Since VRESH=VDD is held in a conventional scanning circuit, the reset level can be increased up to only VDD−Vth. Since, however, the scanning circuit of the present invention includes the level conversion circuit, ΦRES is used as a pulse having the voltage range of VRESH to VSS, the reset level is set higher than in the conventional scanning circuit, and the dynamic range can be widened. The chip area is greatly reduced in comparison with the use of a plurality of scanning circuits having different power supply voltages.

In the seventh embodiment of the present invention, the scanning circuit described in each of the third to fifth embodiments is applied to the vertical scanning circuit of a solid-state image pickup device shown in FIG. 15. The seventh embodiment can improve the dark current characteristic and dynamic range of the solid-state image pickup device. In the seventh embodiment, a pulse ΦTX(n) supplied to the gate of a transfer MOSFET 3 is converted from the voltage range of VDD to VSS to the voltage range of VDD to VTXL. In this case, VTXL is set lower than a common negative power supply VSS. The potential below the gate electrode of the transfer MOSFET 3 during the exposure/accumulation period can be controlled to easily accumulate holes below the gate electrode and suppress a dark current component generated below the gate electrode. The low level of ΦRES(n) remains VSS, and the following effect can be attained. The reset level described in the fourth embodiment is lower than VRESH-Vth by ΔCK due to clock leakage caused by the gate-source capacitive coupling of the reset MOSFET 4 at an instant when the reset MOSFET 4 is turned off. The decrease ΔCK by clock leakage increases because the amplitude of ΦRES increases as the low level of ΦRES decreases. If the low level remains VSS, like the seventh embodiment, ΔCK does not increase, and a decrease in dynamic range can be avoided. The punch-through current of the level conversion circuit cannot be ignored in the accumulation period in which ΦTX is at low level on all rows or the read period in which ΦTX is at low level on all rows except for one row. The seventh embodiment can reduce power consumption by employing a level conversion circuit which incorporates a punch-through current suppression circuit as described in the fourth or fifth embodiment.

Figure 16:
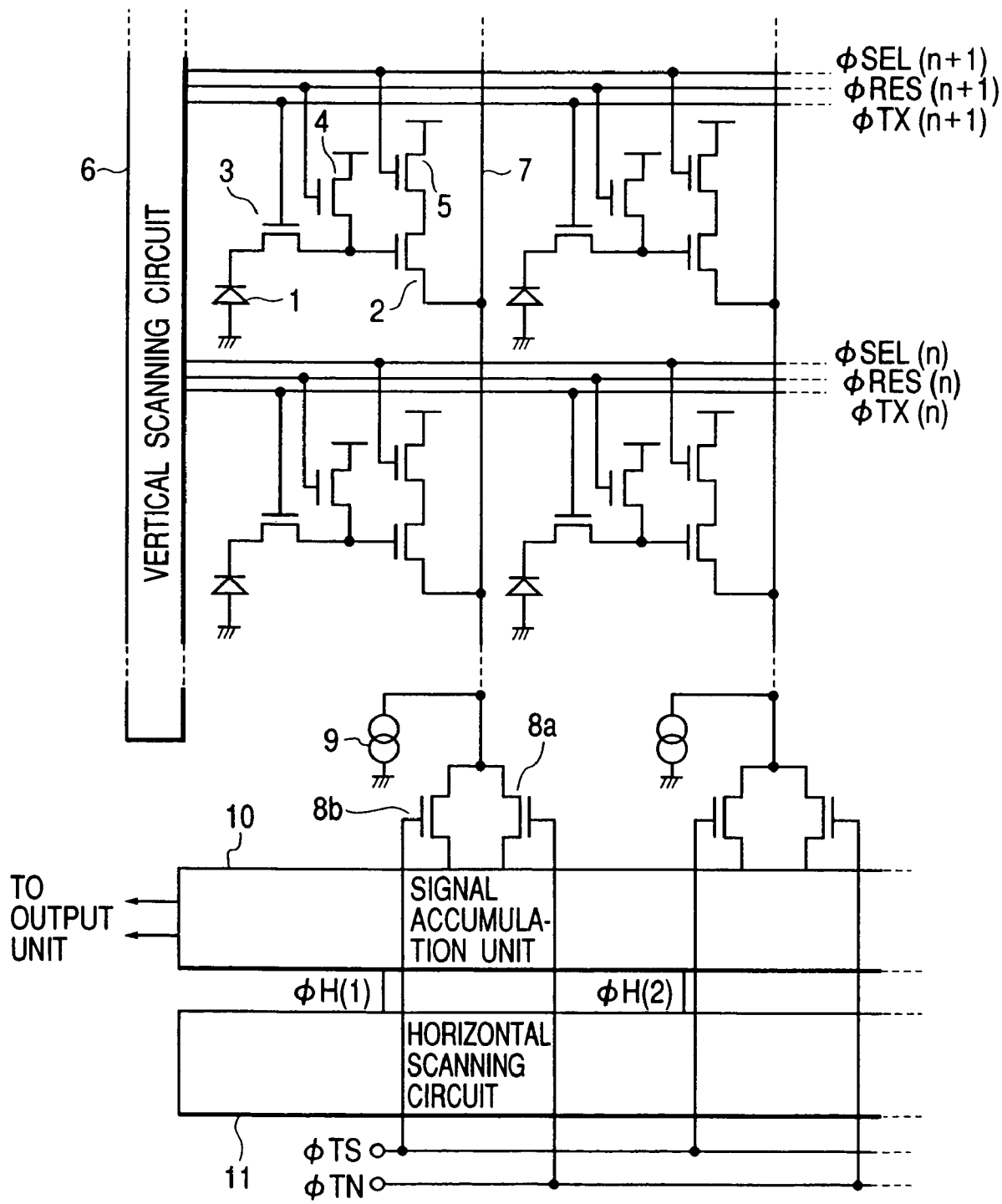
FIG. 16 is a diagram showing the sensor of a solid-state image pickup device according to the eighth embodiment of the present invention.

In the eighth embodiment of the present invention, the scanning circuit described in each of the third to fifth embodiments is applied to the vertical scanning circuit of a solid-state image pickup device shown in FIG. 16. This eighth embodiment implements a method of improving the lineality and dynamic range that is disclosed in Japanese Patent Application Laid-Open No. 11-103043. As disclosed in Japanese Patent Application Laid-Open No. 11-103043, in a solid-state image pickup device in which a selector MOSFET 5 is connected between an amplifier MOSFET 2 and a pixel power supply VDD, gate high level (VSELH) applied to the selector MOSFET 5 is set higher than gate high level (VDD) of a reset MOSFET 4. This improves the lineality on the low-luminance side, and widens the effective dynamic range. The eighth embodiment can reduce the area of the scanning circuit by using the scanning circuit described in each of the third to fifth embodiments.

In the third to eighth embodiments, MOSFETs are adopted as transistors, but other transistors such as bipolar transistors may be adopted.

As described above, the scanning circuit according to each of the third to fifth embodiments incorporates a level conversion function, and can output a plurality of pulses having different voltage ranges to cause a circuit to be scanned to perform special operation. When this scanning circuit is applied to a solid-state image pickup device, a high-image-quality solid-state image pickup device improved in dynamic range and dark current characteristic can be implemented. In the first, second, and seventh embodiments, signal charges are electrons. Even when signal charges are holes, the same effects can also be obtained by inverting the polarity. The present invention is not limited to the circuit arrangement, voltage value, or the like described in the above embodiments. The effects of the present invention become more prominent in a miniaturization process which uses a lower power supply voltage. Solid-state image pickup devices in each of the first, second, and sixth to eighth embodiments are formed on a single semiconductor substrate by a CMOS process.

The ninth embodiment when the solid-state image pickup device described in any one of the first, second, and sixth to eighth embodiments is applied to a still camera (image pickup apparatus) will be described in detail with reference to FIG. 19.

Figure 19:
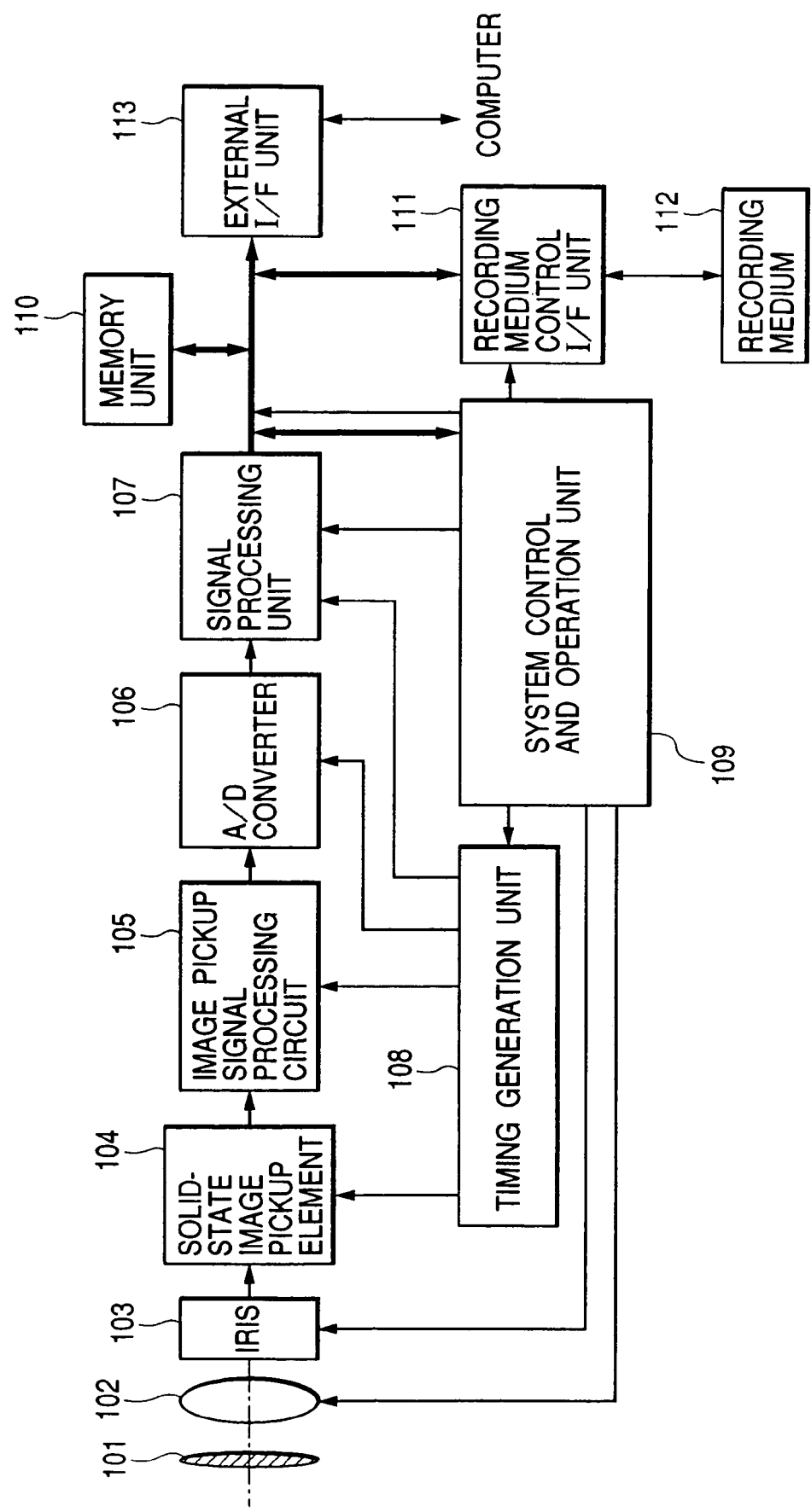
FIG. 19 is a diagram showing a still camera to which a solid-state image pickup device of the present invention is applied according to the ninth embodiment.

In FIG. 19, a barrier 101 serves as both a lens protector and main switch. A lens 102 forms an optical image of an object on a solid-state image pickup device 104. An iris 103 varies the light quantity having passed through the lens 102. The solid-state image pickup device 104 captures the object image formed on the lens 102 as an image signal. An A/D converter 106 analog-to-digital-converts the image signal output from the solid-state image pickup device 104. A signal processing unit 107 executes various correction processes for the image data output from the A/D converter 106, or compresses data. A timing generation unit 108 outputs various timing signals to the solid-state image pickup device 104, an image pickup signal processing circuit 105, the A/D converter 106, and the signal processing unit 107. A system control and operation unit 109 controls various operations and the whole still camera. A memory unit 110 temporarily stores image data. An I/F unit 111 is used to record/read out data on/from a recording medium. Image data is recorded/read out on/from a detachable recording medium 112 such as a semiconductor memory. An I/F unit 113 is used to communicate with an external computer or the like.

The operation of the still camera in image pickup with the above arrangement will be explained.

When the barrier 101 is opened, the main power supply is turned on, the power supply of the control system is turned on, and the power supply of the image pickup system circuit including the A/D converter 106 is turned on.

To control the exposure amount, the system control and operation unit 109 sets the iris 103 to a full-aperture state. A signal output from the solid-state image pickup device 104 is converted by the A/D converter 106, and input to the signal processing unit 107. The system control and operation unit 109 calculates the exposure amount on the basis of the data.

The brightness is determined from the results of photometry, and the system control and operation unit 109 controls the iris in accordance with the results.

A high-frequency component is extracted from the signal output from the solid-state image pickup device 104, and the system control and operation unit 109 calculates the distance to the object. The lens is driven to check whether the image is in focus or not. If the image is out of focus, the lens is driven again to measure the distance.

After an in-focus state is confirmed, actual exposure starts.

After exposure, an image signal output from the solid-state image pickup device 104 is A/D-converted by the A/D converter 106, and written in the memory unit by the system control and operation unit 109 via the signal processing unit 107.

Data accumulated in the memory unit 110 are recorded on the detachable recording medium 112 such as a semiconductor memory via the recording medium control I/F unit under the control of the system control and operation unit 109.

Data may be directly input to a computer or the like via the external I/F unit 113 to process an image.

Many widely different embodiments of the present invention may be constructed without departing from the spirit and scope of the present invention. It should be understood that the present invention is not limited to the specific embodiments described in the specification, except as defined in the appended claims.

What is claimed is:

1. A scanning circuit comprising:
   a shift register; and
   pulse output circuits being arranged respectively on stages of said shift register for outputting a plurality of pulses based on a pulse from the shift register, wherein each pulse output circuit includes a level conversion circuit adapted to convert a voltage range of the pulse from the shift register, the level conversion circuit includes a punch-through current suppression circuit adapted to suppress a punch-through current, and the plurality of pulses outputted from the pulse output circuit have different voltage ranges, and wherein the level conversion circuit includes a CMOS inverter, and the punch-through current suppression circuit suppresses a current punching through the CMOS inverter.

2. The scanning circuit according to claim 1, wherein the punch-through current suppression circuit is a transistor connected in series between the CMOS inverter and a power source, and the transistor is controlled by a pulse outputted and level converted by the level conversion circuit.

3. An image pickup apparatus comprising a scanning circuit according to claim 1.

4. The scanning circuit according to claim 1, wherein the different voltage ranges of the plurality of pulses outputted from the pulse output circuit includes the same voltage range as that of a voltage range of the pulse outputted from the shift register and a voltage range convened by the level conversion circuit.

5. The scanning circuit according to claim 1, wherein the punch-through current suppression circuit is arranged in series between the CMOS inverter and a voltage power source, and includes a transistor having a short-circuited gate and drain.

6. A scanning circuit comprising:

a shift register; and pulse output circuits being arranged respectively on stages of said shift register for outputting a plurality of pulses based on a pulse from the shift register, wherein each pulse output circuit includes a level conversion circuit adapted to convert a voltage range of the pulse from the shift register, the level conversion circuit includes a complementary CMOS inverter, and a transistor connected in series between the CMOS inverter and a power source, the transistor is controlled by a pulse outputted and level converted by the level conversion circuit, and the plurality of pulses from the pulse output circuit have different voltage ranges.

7. An image pickup apparatus comprising a scanning circuit according to claim 6.

8. The scanning circuit according to claim 6, wherein the different voltage ranges of the plurality of pulses outputted from the pulse output circuit includes the same voltage range as that of a voltage range of the pulse outputted from the shift register and a voltage range convened by the level conversion circuit.

9. A scanning circuit comprising:

a shift register; and pulse output circuits being arranged respectively on stages of said shift register for outputting a plurality of pulses based on a pulse from the shift register, wherein each pulse output circuit includes a level conversion circuit adapted to convert a voltage range of the pulses from the shift register, wherein the level conversion circuit includes a CMOS inverter, and a transistor connected in series between the CMOS inverter and a voltage power source, the transistor having a short-circuited gate and a drain, and wherein the pulse output circuit outputs the plurality of pulses having different voltage ranges.

10. The scanning circuit according to claim 9, wherein the different voltage ranges of the plurality of pulses outputted from the pulse output circuit includes the same voltage range as that of a voltage range of the pulse outputted from the shift register and a voltage range convened by the level conversion circuit.

* * * * *